(12) United States Patent
Carballal Camacho

(10) Patent No.: US 11,134,622 B2
(45) Date of Patent: Oct. 5, 2021

(54) DEVICE FOR CLEANING ARTIFICIAL TURF

(71) Applicant: Comercial Carma, S.A., Madrid (ES)

(72) Inventor: Lisardo Carballal Camacho, Madrid (ES)

(73) Assignee: Comercial Carma, S.A., Madrid (ES)

( * ) Notice: Subject to any disclaimer, the term of this patent is extended or adjusted under 35 U.S.C. 154(b) by 0 days.

(21) Appl. No.: 16/487,244

(22) PCT Filed: Nov. 17, 2017

(86) PCT No.: PCT/ES2017/000145
§ 371 (c)(1),
(2) Date: Aug. 20, 2019

(87) PCT Pub. No.: WO2018/154148
PCT Pub. Date: Aug. 30, 2018

(65) Prior Publication Data
US 2019/0364750 A1 Dec. 5, 2019

(30) Foreign Application Priority Data
Feb. 23, 2017 (ES) .......................... ES201700109U

(51) Int. Cl.
*A46B 13/02* (2006.01)
*A01G 20/43* (2018.01)
(52) U.S. Cl.
CPC .............. *A01G 20/43* (2018.02); *A46B 13/02* (2013.01); *A46B 2200/3073* (2013.01)
(58) Field of Classification Search
CPC ............ A46B 13/02; A46B 2200/3073; A01G 20/40; A01G 20/43
See application file for complete search history.

(56) References Cited

U.S. PATENT DOCUMENTS 4,047,367 A * 9/1977 Thorud ................ A01D 43/063
56/202
4,467,591 A 8/1984 Dynie
(Continued)

FOREIGN PATENT DOCUMENTS

CA 2955813 1/2016
CN 102612876 8/2012
(Continued)

OTHER PUBLICATIONS

International Search Report in corresponding PCT Application No. PCT/ES2017/000145, dated Feb. 26, 2018 (Engish translation attached).
(Continued)

*Primary Examiner* — Randall E Chin
(74) *Attorney, Agent, or Firm* — Hovey Williams LLP

(57) ABSTRACT

The object of the invention is a device for cleaning artificial turf comprising a frame (1) supported on four wheels (2), an electric motor (5), a roller axle (8), a transmission for transmitting the rotation of the electric motor (5) to the roller axle (8) and at least one brush roller (9) on the roller shaft (8), such that the brush roller (9) comprises a plurality of bristles (10) distributed in one direction on one half of the brush roller (9) and in the opposite direction on the other half of the brush roller (9), and such that the wheels (2) are connected to a front axle (3) and to a rear axle (4) in pairs, the front axle (3) being a pivoting axle.

15 Claims, 2 Drawing Sheets

(56) References Cited

U.S. PATENT DOCUMENTS

| | | | |
|---|---|---|---|
| 5,269,082 A | | 12/1993 | Sund et al. |
| 5,493,851 A | | 2/1996 | Katzer et al. |
| 5,603,173 A | | 2/1997 | Brazell |
| 6,003,186 A | * | 12/1999 | Larson ............... E01H 1/045 |
| | | | 15/182 |
| 6,076,265 A | | 6/2000 | Huang Lo |
| 2006/0096136 A1 | | 5/2006 | Shaffer et al. |
| 2007/0180807 A1 | * | 8/2007 | Castoldi ............ A01D 34/535 |
| | | | 56/294 |
| 2011/0010879 A1 | * | 1/2011 | Dairon ............... A01G 20/43 |
| | | | 15/105 |
| 2011/0247152 A1 | * | 10/2011 | Dairon ............... A01G 20/43 |
| | | | 15/21.1 |
| 2013/0192633 A1 | | 8/2013 | Gil |
| 2016/0230361 A1 | | 8/2016 | Prew |

FOREIGN PATENT DOCUMENTS

| | | |
|---|---|---|
| GB | 2301012 | 11/1996 |
| KR | 101080190 | 11/2011 |
| WO | 2016042383 | 3/2016 |

OTHER PUBLICATIONS

Extended European Search Report in corresponding European Patent Application Serial No. 17897373.1, dated Dec. 8, 2020.
International Search Report in PCT Application No. PCT/ES2017/000144, dated Apr. 3, 2018 (English translation attached) from co-pending U.S. Appl. No. 16/487,186.

* cited by examiner

DEVICE FOR CLEANING ARTIFICIAL TURF

RELATED APPLICATIONS

This application is the U.S. National Stage of International Patent Application No. PCT/ES2017/000145, filed Nov. 17, 2017, which is hereby incorporated by reference in its entirety, and which claims priority to Spanish Patent Application No. 0201700109, filed Feb. 23, 2017.

OBJECT OF THE INVENTION

The present invention relates to a device for cleaning artificial turf which, by means of a simple system of rollers, provides optimum features for cleaning and maintaining artificial turf in optimum conditions.

Technical Problem to be Resolved and Background of the Invention

There are currently many different types of artificial turf that substitute traditional turf, since the maintenance of traditional turf is complicated, expensive and requires continuous attention with respect to cutting, as well as fertilisers and nutrients that must be added for the correct growth thereof. On occasions, even when taking all of the necessary precautions and properly caring for traditional turf, invasive plant species can ruin an entire field.

Artificial turf has different qualities, according to the thread of which it is made up, and if the thread is too fine and delicate, the fibres will be crushed more easily and the turf will have less resistance.

Furthermore, artificial turf becomes dirty, gets full of dust, mud, seeds, bird droppings, leaves, sand and other human elements such as paper, sunflower seeds and cigarette butts, which facilitate the formation of algae, moss or weeds, which can affect the drainage required by an artificial turf installation.

The fibre of the turf tends to lose its upright firmness over time due to the weather, especially if the use thereof is continuous, which becomes an aesthetic problem, and also constitutes a problem when demonstrating a field with artificial turf.

Furthermore, in turf subjected to an intensive use, a phenomenon known as defibrillation occurs, which happens when we have too little infill or it is unduly moved, and as such the fibre opens into more fibres due to the friction of user's shoes, leading to the breakage of fine fibres which remain on the surface.

DESCRIPTION OF THE INVENTION

The object of the present invention is a device for cleaning and maintaining artificial turf which, by means of the device itself, allows the turf to be optimally maintained and, in addition, removes the dirt on the same that accumulates from falling leaves or dirt created by people.

The device for cleaning artificial turf object of the invention comprises a frame supported on four wheels, an electric motor, a roller shaft, a transmission for transmitting the rotation of the electric motor to the roller shaft and at least one brush roller on the roller shaft which cleans the dirt that accumulates on the artificial turf.

The brush roller of the device for cleaning artificial turf object of the invention comprises a plurality of bristles distributed in one direction on one half of the brush roller and in the opposite direction on the other half of the brush roller, and as such the rotation of the brush roller in a single direction favours the collection of dirt.

In the device for cleaning artificial turf object of the invention, the wheels are connected to a front axle and to a rear axle in pairs, the front axle being a pivoting axle.

The transmission of the device for cleaning artificial turf object of the invention comprises a transmission belt and a plurality of rollers on the roller shaft connected to gear down the rotational movement that reaches the brush roller from the electric motor.

The device for cleaning artificial turf object of the invention comprises a U-shaped structure with two branches and a core, the U-shaped structure being fixed to the frame by the branches of the U shape.

The device for cleaning artificial turf object of the invention comprises a collection box fixed to the rear part of the frame which is configured to collect the debris that the brush roller picks up from the turf.

The device for cleaning artificial turf object of the invention comprises a hinged cover on the frame located at the rear part of the frame.

The collection box of the device for cleaning artificial turf object of the invention has a parallelepiped shape, with two side walls, a base, a rear wall and a ceiling that extends over the side walls with the ceiling having a size that configures an accommodation for the hinged cover supported on the side walls, such that the hinged cover and the ceiling of the collection box cover the entire upper part of the aforementioned collection box.

DESCRIPTION OF THE DRAWINGS

To complete the description, the present specification is accompanied by a set of figures constituting an integral part of the same, which represent the following.

PREFERRED EMBODIMENT OF THE INVENTION

Figure 1:
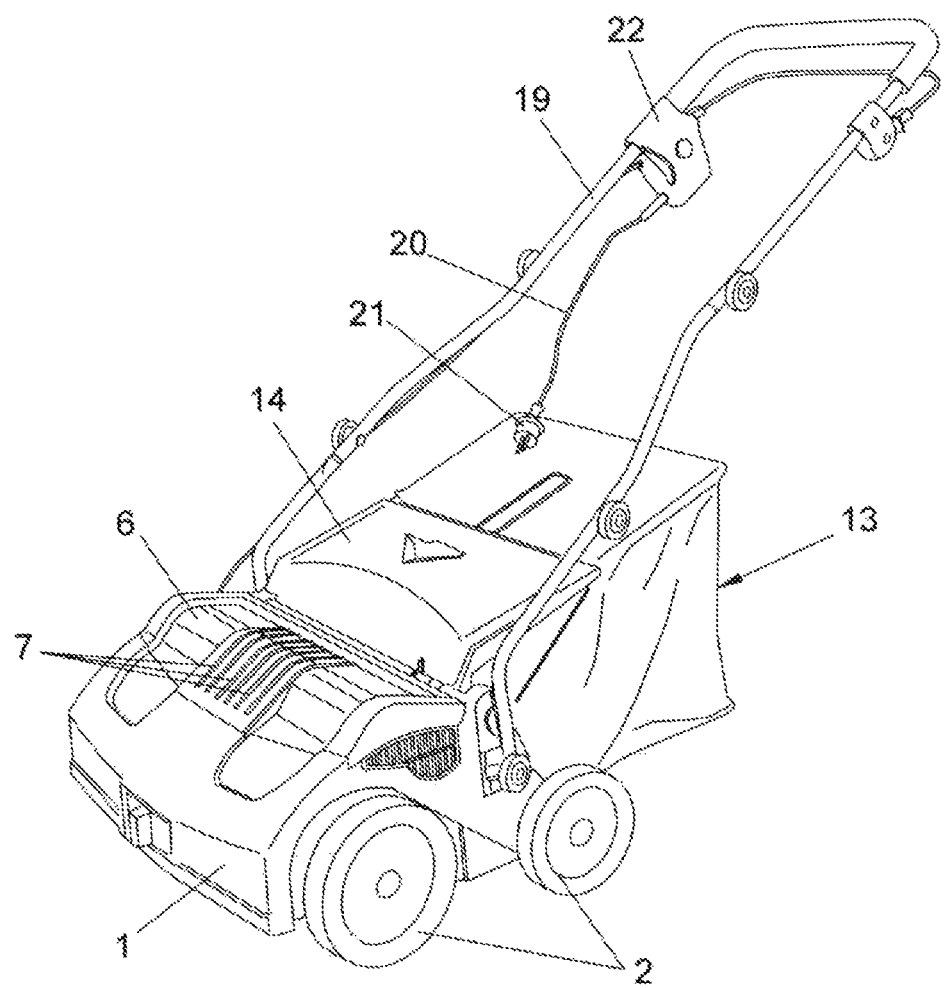
FIG. 1 shows a perspective view of the device for cleaning artificial turf object of the invention.
Figure 2:
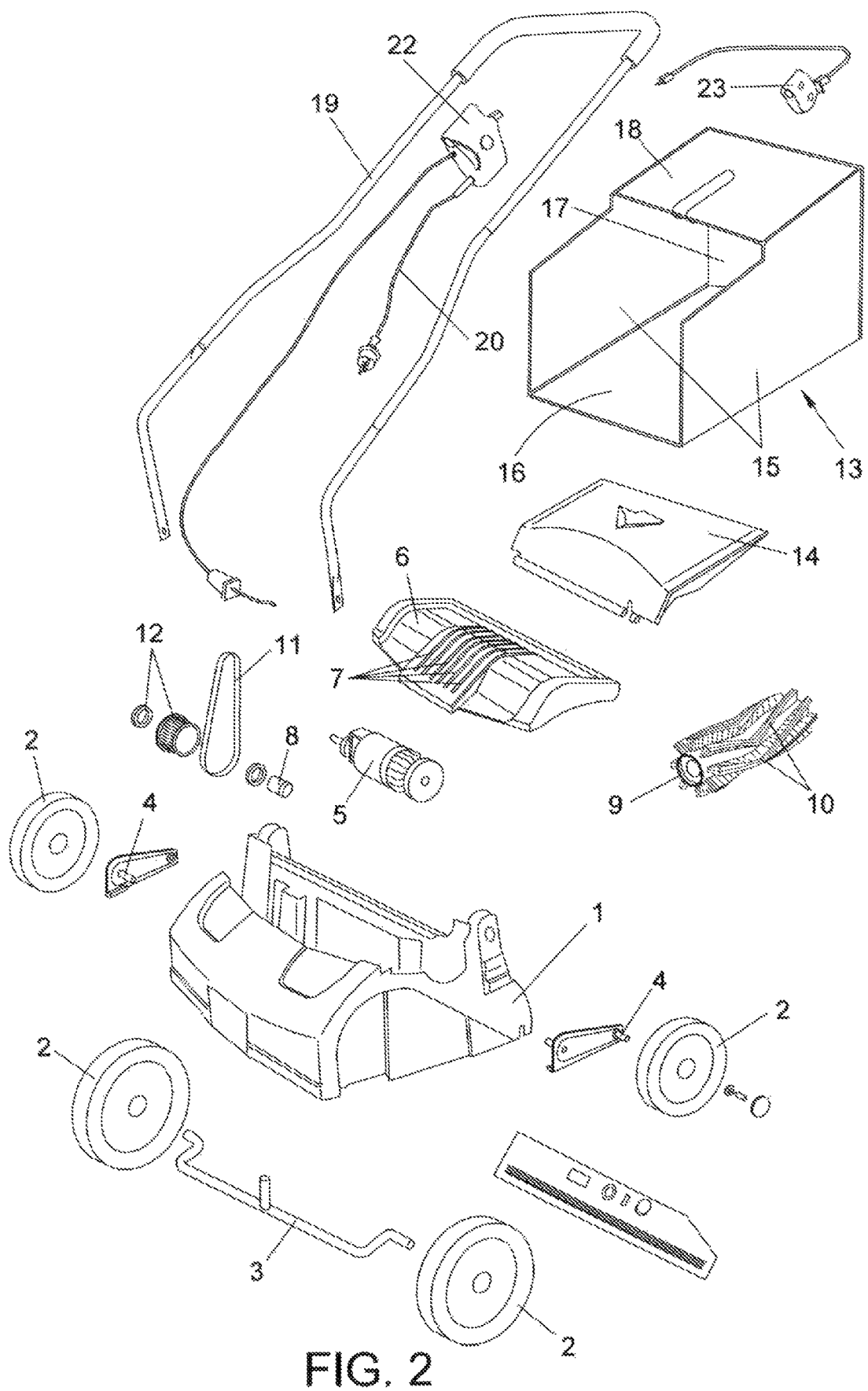
FIG. 2 shows an exploded view of all of the components of the device for cleaning artificial turf object of the invention.

The object of the present invention, as previously mentioned and as can be seen in the figures, is a device for cleaning artificial turf comprising a frame (1) supported on four wheels (2), the wheels (2) being connected to a front axle (3) and to a rear axle (4) in pairs.

The device for cleaning artificial turf object of the invention comprises an electric motor (5) housed in an upper part of the frame (1) and protected by an upper cover (6) that has a plurality of slits (7) for cooling the electric motor.

Also located on the inside of the frame (1) is a roller shaft (8) that holds a single brush roller (9), which has a plurality of bristles (10) distributed in one direction on one half of the brush roller (9) and in the opposite direction on the other half of the brush roller (9), and thus the rotation of the roller shaft (8) in a single direction enables the brush roller (9) to sweep the dirt using the entire the surface of the brush roller (9) when passing over the artificial turf.

The front axle (3) is a pivoting axle, which allows the frame (1) to be lifted and lowered and allows the brush roller (9) to be moved closer to the artificial turf, while the rear axle (4) is an axle fixed in its position in the frame (1).

In order for the roller shaft (8) to rotate, the device object of the invention has a transmission for transmitting the rotation of the electric motor (5) situated in the upper part of the frame (1) to the roller shaft (8) which is in a lower part of the frame (1), logically as close to the ground as possible to condition the artificial turf.

The transmission comprises a transmission belt (11) and a plurality of rollers (12) on the roller shaft (8) which achieve a gear reduction in the rotational movement that reaches the brush roller (9) from the electric motor (5).

The device object of the invention has collection box (13) connected to the rear part of the frame (1) which, by means of a rear outlet of the frame (1), is configured for collecting the debris that the brush roller (9) picks up on the turf, sweeping and projecting them into the collection box.

The collection box (13) is configured to be able to be removed from the frame (1) and be emptied when necessary, and to this end it comprises two hook-shaped ends that are housed on a rear part of the frame (1).

When the collection box (13) is not fixed to the frame (1), the device object of the invention comprises a hinged cover (14) which covers the rear part of the frame and is fixed to the upper part of the rear outlet of the frame, such that it can rotate around the fastening area.

In addition, the collection box (13) has a parallelepiped shape, with two side walls (15), a base (16), a rear wall (17) and a ceiling (18), such that the ceiling (18) extends over the side walls (15) but leaves space so that the hinged cover (14), in the position in which the rear outlet of the frame (1) is open, is supported on the side walls (15) and, along with the ceiling (18) of the collection box (13), covers the entire upper part of the aforementioned collection box, such that with the collection box (13) fixed to the frame, a closed space behind the rear outlet of the frame (1) is created, where the debris picked up by the brush roller (9) ends up.

To be able to handle the device object of the invention, a U-shaped structure (19) is fixed to the frame (1), fixed to the frame (1) by branches of the U shape, while a core serves as a support for the user of the device. Furthermore, the U-shaped structure (19) serves as a guide for an electric installation that provides electric energy to the electric motor, such that coming from the core of the U is a cable (20) with a plug (21) to be able to connect the device object of the invention to the electrical grid.

Located at the same point at which the cable (20) with the plug (21) comes out, there is a safety switch of the device object of the invention, of those known in the state of the art, such that it is only necessary to press a bar (23) and a button (22) at the same time to start up the electric motor (5) of the device object of the invention.

INDUSTRIAL APPLICATION

The device for cleaning artificial turf object of the invention can be applied in the industry of light garden machinery.

The invention claimed is:

1. A device for cleaning artificial turf, characterised in that the device comprises a frame (1) supported on four wheels (2), an electric motor (5), a roller shaft (8), a transmission for transmitting the rotation of the electric motor (5) to the roller shaft (8), at least one brush roller (9) on the roller shaft (8), and a collection box (13) fixed to a rear part of the frame (1) and configured to collect debris that the brush roller (9) picks up from the artificial turf,
    the collection box (13) having a parallelepiped shape, with two side walls (15), a base (16), a rear wall (17), and a ceiling (18) that extends over the side walls (15) with the ceiling (18) having a size that configures an accommodation for a hinged cover (14) supported on the side walls (15), such that the hinged cover (14) and the ceiling (18) of the collection box (13) cover the entire upper part of the aforementioned collection box (13).

2. The device for cleaning artificial turf according to claim 1, characterised in that the brush roller (9) comprises a plurality of bristles (10) distributed in one direction on one half of the brush roller (9) and in the opposite direction on the other half of the brush roller (9).

3. The device for cleaning artificial turf according to claim 1, characterised in that the wheels (2) are connected to a front axle (3) and to a rear axle (4) in pairs, the front axle (3) being a pivoting axle.

4. The device for cleaning artificial turf according to claim 1, characterised in that the transmission comprises a transmission belt (11) and a plurality of rollers (12) on the roller shaft (8) connected to gear down the rotational movement that reaches the brush roller (9) from the electric motor (5).

5. The device for cleaning artificial turf according to claim 1, characterised in that the device comprises a U-shaped structure (19) with two branches and a core, the U-shaped structure (19) being fixed to the frame (1) by the branches of the U shape.

6. The device for cleaning artificial turf according to claim 1, characterised in that the device comprises a hinged cover (14) on the frame (1) located at a rear part of the frame (1).

7. The device for cleaning artificial turf according to claim 1, characterised in that the transmission comprises a transmission belt (11) and a plurality of rollers (12) on the roller shaft (8) connected to gear down the rotational movement that reaches the brush roller (9) from the electric motor (5).

8. The device for cleaning artificial turf according to claim 1, characterised in that the device comprises a U-shaped structure (19) with two branches and a core, the U-shaped structure (19) being fixed to the frame (1) by the branches of the U shape.

9. The device for cleaning artificial turf according to claim 1, characterised in that the device comprises a hinged cover (14) on the frame (1) located at a rear part of the frame (1).

10. A device for cleaning artificial turf, characterised in that the device comprises a frame (1) supported on four wheels (2), a hinged cover (14) on the frame (1) located at a rear part of the frame (1), an electric motor (5), a roller shaft (8), a transmission for transmitting the rotation of the electric motor (5) to the roller shaft (8), and at least one brush roller (9) on the roller shaft (8),
    the brush roller (9) comprising a plurality of bristles (10) arranged in a number of circumferentially spaced rows, each row including two angled sections cooperatively defining a central apex, with a first one of the sections extending from the apex at a first angle relative to a rotational axis of the brush roller (9) and a second one of the sections extending from the apex at a second angle opposite the first angle.

11. The device for cleaning artificial turf according to claim 10, characterised in that the wheels (2) are connected to a front axle (3) and to a rear axle (4) in pairs, the front axle (3) being a pivoting axle.

12. The device for cleaning artificial turf according to claim 10, characterised in that the transmission comprises a transmission belt (11) and a plurality of rollers (12) on the roller shaft (8) connected to gear down the rotational movement that reaches the brush roller (9) from the electric motor (5).

13. The device for cleaning artificial turf according to claim 10, characterised in that the device comprises a U-shaped structure (19) with two branches and a core, the U-shaped structure (19) being fixed to the frame (1) by the branches of the U shape.

14. The device for cleaning artificial turf according to claim 10, characterised in that the device comprises a collection box (13) fixed to a rear part of the frame (1) and configured to collect debris that the brush roller (9) picks up from the artificial turf.

15. The device for cleaning artificial turf according to claim 14, characterised in that the collection box (13) has a parallelepiped shape, with two side walls (15), a base (16), a rear wall (17), and a ceiling (18) that extends over the side walls (15) with the ceiling (18) having a size that configures an accommodation for a hinged cover (14) supported on the side walls (15), such that the hinged cover (14) and the ceiling (18) of the collection box (13) cover the entire upper part of the aforementioned collection box (13).

* * * * *